United States Patent [19]

Augenbraun et al.

[11] Patent Number: 5,857,181
[45] Date of Patent: *Jan. 5, 1999

[54] BROADCAST INTERACTIVE MULTIMEDIA SYSTEM

[75] Inventors: Joseph Ellis Augenbraun, Princeton, N.J.; Larry Alan Pearlstein, Newtown; Michael Allen Plotnick, Southampton, both of Pa.

[73] Assignee: Hitachi America Ltd., Tarrytown, N.Y.

[ * ] Notice: The term of this patent shall not extend beyond the expiration date of Pat. No. 5,617,565.

[21] Appl. No.: 900,521

[22] Filed: Jul. 25, 1997

Related U.S. Application Data

[63] Continuation of Ser. No. 719,574, Sep. 26, 1996, which is a continuation of Ser. No. 346,515, Nov. 29, 1994, Pat. No. 5,617,565.

[51] Int. Cl.⁶ .................................................. G06F 17/30
[52] U.S. Cl. .............................................. 707/2; 707/102
[58] Field of Search ........................................ 707/2, 102

[56] References Cited

U.S. PATENT DOCUMENTS

| | | |
|---|---|---|
| 4,388,645 | 6/1983 | Cox et al. . |
| 4,602,275 | 7/1986 | Smith et al. . |
| 4,614,972 | 9/1986 | Motsch et al. . |
| 4,679,083 | 7/1987 | Schmitz et al. . |
| 4,695,900 | 9/1987 | Honjo et al. . |
| 4,837,620 | 6/1989 | Harvey . |
| 5,008,853 | 4/1991 | Bly et al. . |
| 5,144,663 | 9/1992 | Kudelski et al. . |
| 5,181,113 | 1/1993 | Chang . |
| 5,237,411 | 8/1993 | Fink et al. . |
| 5,241,625 | 8/1993 | Epard et al. . |
| 5,265,024 | 11/1993 | Crabill et al. . |
| 5,276,869 | 1/1994 | Forrest et al. . |
| 5,295,244 | 3/1994 | Dev et al. . |
| 5,307,456 | 4/1994 | MacKay . |
| 5,335,277 | 8/1994 | Harvey et al. . |
| 5,347,632 | 9/1994 | Ffilepp et al. . |
| 5,404,383 | 4/1995 | Remillard . |
| 5,404,505 | 4/1995 | Levinson . |

(List continued on next page.)

OTHER PUBLICATIONS

Chang et al., "Intelligent Database Retrieval by Visual Reasoning", *PROC Fourteenth Annual International Computer Software and Applications Conference*, 31 Oct. –1 Nov. 1990, pp. 459–464.

N. Hutheesing, "Interactivity for the passive", *Forbes magazine*, Dec. 6, 1993 (© 1993, Forbes Inc.) (2 pages).

G. Mannes, "Smart Screens", *Video Magazine*, Dec. 1993, (2 pages).

Nussbaumer et al., "Multimedia Delivery on Demand: Capacity Analysis and Implications", *PROC 19th Conference on Local Computer Networks*, 2–5 Oct. 1984, pp. 380–386.

Richards et al., "The Interactive Island", *IEE Review*, Jul./Aug. 1991, pp. 259–263.

Sheth et al., "Evolving Agents for Personalized Information Filtering", *Proceedings of the Ninth Conference on Artificial Intelligence for Applications*, 1–5 Mar. 1993, pp. 345–352.

(List continued on next page.)

*Primary Examiner*—Wayne Amsbury
*Attorney, Agent, or Firm*—Michaelson & Wallace; Peter L. Michaeson; Michael P. Straub

[57] ABSTRACT

A procedure for selecting and storing data elements communicated from a common database to users of the database utilizing a communication link between each transmitter and a concomitant receiver accessible by the user. The transmitted information is augmented with attributes which are used at the receiver to select and then store locally only that information of interest to each receiver's user, wherein the attributes and the user selection pattern determine the criteria for storing information locally. Attributes include: utility of each data element in time; interest categories and level of interest for each of the categories determined for the collective users; repeat time to the data element; and a hyperlink to associated data elements.

15 Claims, 7 Drawing Sheets

U.S. PATENT DOCUMENTS

| | | |
|---|---|---|
| 5,442,771 | 8/1995 | Filepp et al. . |
| 5,446,891 | 8/1995 | Kaplan et al. . |
| 5,446,903 | 8/1995 | Abraham et al. . |
| 5,508,912 | 4/1996 | Schneiderman et al. . |
| 5,513,126 | 4/1996 | Harkins et al. . |
| 5,530,852 | 6/1996 | Meske, Jr. et al. . |
| 5,544,302 | 8/1996 | Nguyen ................................. 345/326 |
| 5,555,376 | 9/1996 | Theimer et al. .................. 395/200.59 |
| 5,617,565 | 4/1997 | Augenbraun et al. ...................... 707/4 |
| 5,636,346 | 6/1997 | Saxe ........................................... 705/1 |
| 5,689,553 | 11/1997 | Ahuhja et al. ........................... 379/202 |
| 5,774,357 | 6/1998 | Hoffberg et al. ....................... 364/188 |

OTHER PUBLICATIONS

Yan et al., "Index Structures for Information Filtering Under the Vector Space Model", *Proceedings of the 10$^{th}$ International Conference on Data Engineering,* 14–18 Feb. 1994, pp. 337–347.

User's Manual relating to DRD203RW "DSS Digital Satellite System", pp. 12–28.

| $E_n$ | $m_{n,1}$ | $m_{n,2}$ | ... | $\xi(t)$ |

| $DE_n$ | Size | IDENTIFIER | $IG_1$ | $IL_1$ | $IG_2$ | $IL_2$ | ... | UTILITY IN TIME | REPEAT TIME | TIME OF ARRIVAL |

BROADCAST INTERACTIVE MULTIMEDIA SYSTEM

This application is a continuation of patent application Ser. No. 08/719,574; filed Sep. 26, 1996 which is a continuation of application Ser. No. 08/346,515; filed Nov. 29. 1994 (now U.S. Pat. No. 5,617,565; issued Apr. 1, 1997).

BACKGROUND OF THE DISCLOSURE

1. Field of the Invention

This invention relates to broadcast information systems and, more particularly, to broadcast interactive multimedia systems which access hyperlinked multimedia databases.

2. Description of the Background Art

It is widely recognized that there is value in systems which allow each individual user to interactively navigate hyperlinked multimedia (hypermedia) databases. For example, one type of system includes the commercially popular multimedia CD-ROM based encyclopedias such as Microsoft's Encarta and Compton's Interactive Encyclopedia. Another example of an interactive hypermedia database that is growing in popularity is the World Wide Web (WWW). WWW is an Internet-based distributed hypermedia database which is primarily accessed using the Mosaic client interface software.

These two examples of hypermedia represent two broad classes of hypermedia which presently exist. The first class is characterized by systems wherein the database is stored locally, usually either on a fixed disk or a CD-ROM. Systems of this class exhibit relatively rapid access times but they are not easily updated with new information and are limited in size by storage costs.

The second class is comprised of systems wherein the database is remote and shared by many users. In this case, the database may be much larger than the local-type databases since the storage costs can be shared over a large number of users. Data elements are sent via a bi-directional transmission medium in response to user-generated requests. Systems of this class may exhibit relatively poor access times due to bottlenecks in the transmission medium and high demand load on the shared storage media. The cost for use of the transmission media, that is, connect time, may represent a significant fraction of the total cost of retrieval of the information.

With the foregoing context-setting discussion in mind, besides the classes of hypermedia systems considered above, other examples of systems which access or deliver text, data, and/or video in an interactive manner have been presented and discussed in the literature.

Representative of the type of system broadly referred to as a "teletext" system or "videotext" system is U.S. Pat. No. 4,614,972, entitled "Teletext Receiver", issued to Motsch et al (hereinafter Motsch). In order to clearly distinguish the system of this reference from the present invention, as well as providing a point of departure for other types of systems discussed shortly in other references, Motsch is now considered is some detail.

The term teletext is used for an information transmission system wherein, besides a conventional television image, additional information can be transmitted in unused lines of the television image. The television receiver, when suitably equipped with a decoder for this additional information, can display this ancillary information. The teletext information originates from a database in which up to several hundred pieces of information are stored.

In a conventional teletext system, the additional information is coded in a digital format and is organized according to a standard particular to a country or regional areas in the world. Illustratively, when using a standard, data is partitioned into bytes which are then sequentially grouped into a block; a header is then added to the block to form a packet, which is the largest piece of information sent during any one interval. To re-generate the additional information at the receiver, several packets are de-multiplexed and sorted to restore the time orientation.

In the system considered by Motsch, separate pieces of information can be multiplexed within the same digital channel by means of imposing an overlay structure to form "articles". In addition, a number of articles may be grouped together to define a "magazine". Such a structure fosters a communication arrangement wherein both information to be displayed directly on the receiver and information which aids in the direct display of such information are multiplexed. Each article is typically composed of four consecutive fields: an article start; an article heading; data; and an article end. Of particular relevance is the article heading, which consists of, in part, a classification sequence chosen by a "classifier entity", such as a knowledgeable individual. The sequence allows a user located at a receiver to select an article, for instance, by its number; this number could be learned from an index which is transmitted as the initial piece of information sent to the user.

In line with the standard considered by Motsch, the classification sequence was made up of three consecutive bytes (C1, C2, C3), each of which had 16 possible values (0–9, A–F). In the standard, only three classes are defined, namely: (1) a class wherein C1C2C3 ranged between 001 and 999; (2) a class wherein C1=C2=C3=0; and (3) a class wherein at least one of C1, C2, C3 equals A, with the others being between 0 and 9. The user selects an article by typing on a keyboard a number having three digits (called A1, A2, A3) between 001 and 999; it is clear that this selection results in user access to only those articles in the first class.

In the first teletext systems, the information for a single display on the receiver (a "page") was contained entirely within an article. The choice of a page from among the cyclically transmitted articles was effected by comparison of the A1A2A3 sequence to the C1C2C3 sequence in an incoming article. However, over time, articles became much more complex and the information corresponding to a desired page to be displayed could no longer be included within a single article. As an example, a so-called "teleloading" article may be required to help display several pages; teleloading information includes, for instance, page bottom information or range of color for the display of the pages. Each of these supplementary articles relating to interdependent pages is given a separate article number. Thus, a teletext receiver must take into account several articles for a single set of A1, A2, A3 digits.

The contribution of Motsch is that of defining a fourth class of articles so that at least one of the bytes C1, C2, C3 has a value between B and F. Certain subclasses are defined within this fourth class so that the following methodology may be carried out: bytes C1, C2, C3 are compared to A1, A2, A3 as well as to a set of threshold bytes (B1, B2, B3), and from the results of the comparison, the acquisition and storage of incoming articles is decided. Examples of subclasses include: if C1=F, then the article must be acquired and stored; if C1≠B or F, then, after the obligatory articles are stored, articles with the highest value (EFF) down to the lowest (E00) must be acquired and stored, if there is sufficient storage capacity. After each cycle, the state of the storage device is examined, and the threshold values (B1, B2, B3) are adjusted accordingly to store more or less articles, as the case may be.

By way of distinguishing this reference, it is clear that there is no teaching or suggestion in Motsch of an intelligence-gathering process embedded in the receiver which monitors selection patterns of the user, and which utilizes the a results of monitoring in an adaptation or learning process to capture and then store articles that the user may have an interest in as inferred from the user's implicit pattern of selection. In addition, there is no mechanism in which the user may create an initial user profile setting forth the user's preference for articles categorized by classification, and then have the user profile dynamically modified by the learning process. Also, there is no consideration in Motsch of classifying information contained in an article into a plurality of classes based on a plurality of interests which different users of the information may express, either explicitly or implicitly by the user's selection pattern. Furthermore, once different interest categories are allowed for, it is also beneficial to identify different levels of interest for each of the categories to further aid in the information selection process; Motsch does not even suggest such a level of differentiation. Also, there is no suggestion in Motsch that the classification process utilizes parameters other than a single, fixed classification sequence; other parameters or attributes may be utilized in accordance with aspects of the present invention including, for example, the usefulness of the content of a magazine or article as a function of time. Moreover, the use of a hyperlink is not taught or suggested in Motsch, that is, a first article which shares a common interest with a second article does not explicitly contain a pointer to the second article. Finally, Motsch merely teaches a broadcast cycle in which all information is repeated on a periodic, fixed basis within the cycle; there is no suggestion that certain information may be repeated more frequently than other information, depending on the importance of the information, or the size of the information, or the utility in time of the information.

A type of improvement utilized by many videotext systems that is not covered by Motsch is important enough to mention although, while appealing at first glance, the overall improvement to the operation of videotext systems is marginal. Such an improvement is discerned from the perusal of U.S. Pat. No. 4,679,073 issued to Schmitz et al (hereinafter Schmitz). Schmitz is representative of videotext (as well as other types of data-gathering systems) which rely upon the linear nature of the cyclic transmissions to a videotext receiver. It is empirically known that if a user has an interest in a certain page, then there is a great likelihood that the pages arriving just prior to and/or just after the desired page will also be of interest to the user. Thus, certain systems are arranged to store likely relevant pages in a linear fashion, that is, one after another in time of arrival. If a user then desires access to a "nearby" page, the page is accessed directly from storage rather than awaiting the arrival of the information during the next successive cycle. Since a rather rudimentary model for user interest is applied, namely, high relevancy of juxtaposed pages, this so-called linear store and access is only marginally efficient compared to the efficiencies fostered by the present invention.

Another improvement utilized in a subset of teletext systems is presented in U.S. Pat. No. 4,388,645 issued to Cox et al (hereinafter Cox). Oftentimes, teletext communication provided from an orbiting satellite is received by a cable head-end operator and re-broadcast to a plurality of cable subscribers. Teletext information may include multiple pages of a programming guide or the like identifying the content of television programming signals being transmitted by the satellite. The cable head-end facility may then include a teletext decoder with local memory to acquire and store the pages representative of the cable guide. The cable guide may then be is re-transmitted at selected times during the day to inform the cable subscribers of the programming to be expected during upcoming intervals. This arrangement is merely a variation to the teachings of Motsch in that only a certain types of inter-related articles are acquired in stored for eventual re-transmission by an intermediary.

Representative of another type of information-providing system based on user interaction is the USENET system. USENET is a distributed computerized news system commonly associated with the Internet—a network which is composed of thousands of interconnected computer systems. In effect, USENET is a system of distributed databases scattered on computer systems throughout the Internet. Many services are available on USENET, ranging from technical discussions of many aspects of computer, scientific topics such as mathematics or physics, and even to recreational topics such as sports or movies. Central to USENET is the notion of Newsgroups. A newsgroup is a grouping of articles with a related topic; for instance, some examples of newsgroups include "sci.physics" and "rec.movies" corresponding, respectively, to physics under science and movies under recreation. The Newsgroups are arranged in hierarchical order so that related topics are grouped together. Each of these Newsgroups contains a list of articles which are usually of a transient nature and generally are removed from the news server in about one week.

Connections between the computers that participate in the distributed databases comprising USENET communicate with each other and create a set of data that is fed (one-way) to other computer systems that do not participate in maintaining the distributed databases. The administrators of these other computers choose to receive the newsgroups that might be of interest to their users. These computers, in turn, may send the subset of data that they receive downstream to other computers (again, one-way). When a user calls in with a modem to read the news, the user is communicating with one of these computers which received this information through a one-way link. From this brief description, it is apparent that there is no capability in the combination of the USENET and local systems to "learn" of the topical interest of each local user and to guide each such user through the topical list available to the local user in an expedited fashion. (This is true even if all available articles are downloaded, that is, there is no filtering of articles by the administrator.) In short, there is no intelligence in the combination—the user must explicitly pick-and-choose the desired articles. In addition, the limitations presented above with respect to Motsch are also found as deficiencies in the USENET system because no attribute-type information is typically imparted along with the basic information contained in the available material.

Yet another example of an interactive system is the StarSight system made available through StarSight Telecast, Inc. The system is based around a display grid that shows 90 minutes of programming at a time accessible from a user's TV, as provided via over-the-air TV, cable, and/or satellite. The display grid is shown on a TV screen—the StarSight hardware may be incorporated into the TV receiver or stand-alone equipment. Information to populate the grid is generally supplied during the vertical blanking interval of the standard TV signal. The user can scan program information seven days into the future in 90 minute increments.

Using a remote, hand-held type unit to control the demultiplexing unit, the user can highlight a show on the grid and then obtain a capsule description of the contents of the show on the screen. If the user desires to watch the program highlighted, a button on the remote unit is pushed to switch directly to the show. It is also possible to record a show in the future; a push of a button automatically sets an associated VCR via the demultiplexing unit.

The StarSight system allows the user to scroll through a list of all the programs coming up on a channel. Also, whenever a channel is changed, the user sees a display that includes the name of the show, a capsule description, the channel name, and the time remaining in the show. Moreover, it is also possible to search for current and future shows by theme according to categories, such as Movies, Sports, and Specials. In addition, categories are broken down into subcategories so that, for example, Sports may further include Football, Tennis, and Sports Talk. Finally, it is also possible to customize the channel guide in that the channels that the user rarely accesses can be removed upon the initial display; this customization is not automatic—direct user interaction with the StarSight system is required.

It is apparent from this summary of the features of the StarSight system that many of the limitations already discussed with respect to the prior systems also are present in the StarSight system. As one instance, there is no teaching or suggestion that user activity is monitored at the demultiplexing unit so as to learn about user preferences and then dynamically alter the system selection process accordingly. This follows from the fact that the amount of information to be conveyed in the StarSight system, by its very nature, is minuscule compared to the interactive databases such as found on World Wide Web and USENET. As another instance, the type of information provided by the StarSight system is fixed in time by program scheduling, so the usefulness of the information as a function of time is a virtually meaningless measure.

A final class of interactive system that is presently available is the Digital Satellite System (a trademark of Hughes Communications), which uses satellite technology to deliver television programming to a user's home. The programs are broadcast in digital form, and processed by a receiver upon detection by a small dish antenna located at the user's premises. A remote control is used in conjunction with the receiver to navigate an on-screen programming guide. The user can sort the guide so that only specific types of programs are displayed. For example, the user can select the Sports category, and only current and upcoming sports are displayed. There is a menu function that allows each user to customize the display to, for instance: build channel lists; preview coming attractions; and set spending limits. Many of the same deficiencies set forth above with respect to the prior systems are evident in this system. Again, of particular relevance, is the complete lack of ability of the system itself to monitor and dynamically change user preferences inferred from the user's pattern of selection.

As discerned from the foregoing discussion, the art is devoid of teachings and suggestions for systems which provide the combined, desirable properties of: fast (virtually interactive) access time; easy updating with new information; an inexpensive communication link to the user; accessibility to virtually unlimited database size; ease of navigation; and tailored to each individual user's preferences.

SUMMARY OF THE INVENTION

The shortcomings of the prior art as well as other limitations and deficiencies are obviated, in accordance with the present invention, by utilizing a communication link between a transmitter and a concomitant receiver and by supplementing the transmitted information with attributes which may be used at the receiver to select and then store locally only that information of interest to the receiver's user, wherein the attributes and the user selection pattern determine the criteria for storing information locally.

Broadly, in accordance with the system aspect of the present invention, the system is comprised of a transmitter and at least one receiver which is typically geographically dispersed from the transmitter. In the transmitter, data elements are stored in a mass storage database along with associated data attributes that describe the relative value of the each data element to various groups of users (designated, for example, by "interest group" and "level of interest" for each group). Also, other data attributes are attached to the data elements, including the repeat time of the data element (which is function of the size and relative value of the data element), and the utility of the data element as a function of time. The data elements along with their data attribute set are transmitted on a rotating basis through a broadcast channel, which may include broadcasting via terrestrial, satellite, or cable television.

In each associated receiver, certain of the incoming data elements are selected for local storage in the receiver based upon an evaluation of selection criteria which utilize the incoming data attributes and the prior selection pattern of the user of the given receiver; the data elements stored locally are those data elements that are likely to be the most relevant or pertinent to this user. The user navigates the stored data elements through the use of multimedia navigation software and navigation results are presented on a display device. Navigation is fully interactive as long as the user is navigating data elements that have been stored locally. Navigating to a data element which is not present in the local storage produces a message on the display device indicating when the requested data will become available. The receiver includes software to monitor user input to the receiver and then to process the input so as to learn information about the individual user; in turn, the receiver stores locally only data elements as dynamically controlled by the user selection pattern, that is, only those data elements that have the greatest likelihood of being of interest to the individual user.

Broadly, in accordance with the method aspect of the present invention, data elements from a common database are communicated to users of the common database. Data attributes are assigned to each of the data elements and the data elements and the associated data attributes are repeatedly communicated to the users. Each user of the common database has a user profile which is indicative of data elements of interest to this particular user. Data elements of interest to a particular user are locally selected and stored in correspondence to the selection pattern of the user as well as the user profile. The user profile is dynamically changed in correspondence to the selection pattern in order to locally select and store data elements having a high likelihood of being of interest to the particular user.

BRIEF DESCRIPTION OF THE DRAWING

The teachings of the present invention can be readily understood by considering the following detailed description in conjunction with the accompanying drawing, in which:

FIG. 3 is a pictorial layout of an illustrative data attribute set associated with a particular data element;

FIG. 4 is a pictorial layout of an illustrative general data attribute set associated with a particular data element;

To facilitate understanding, identical reference numerals have been used, where possible, to designate identical elements that are common to the figures.

DETAILED DESCRIPTION

After considering the following description, those skilled in the art will clearly realize that the teachings of our invention can be readily utilized in providing broadcast interactive multimedia services utilizing the following methodology and concomitant circuitry.

Overview

Figure 1:
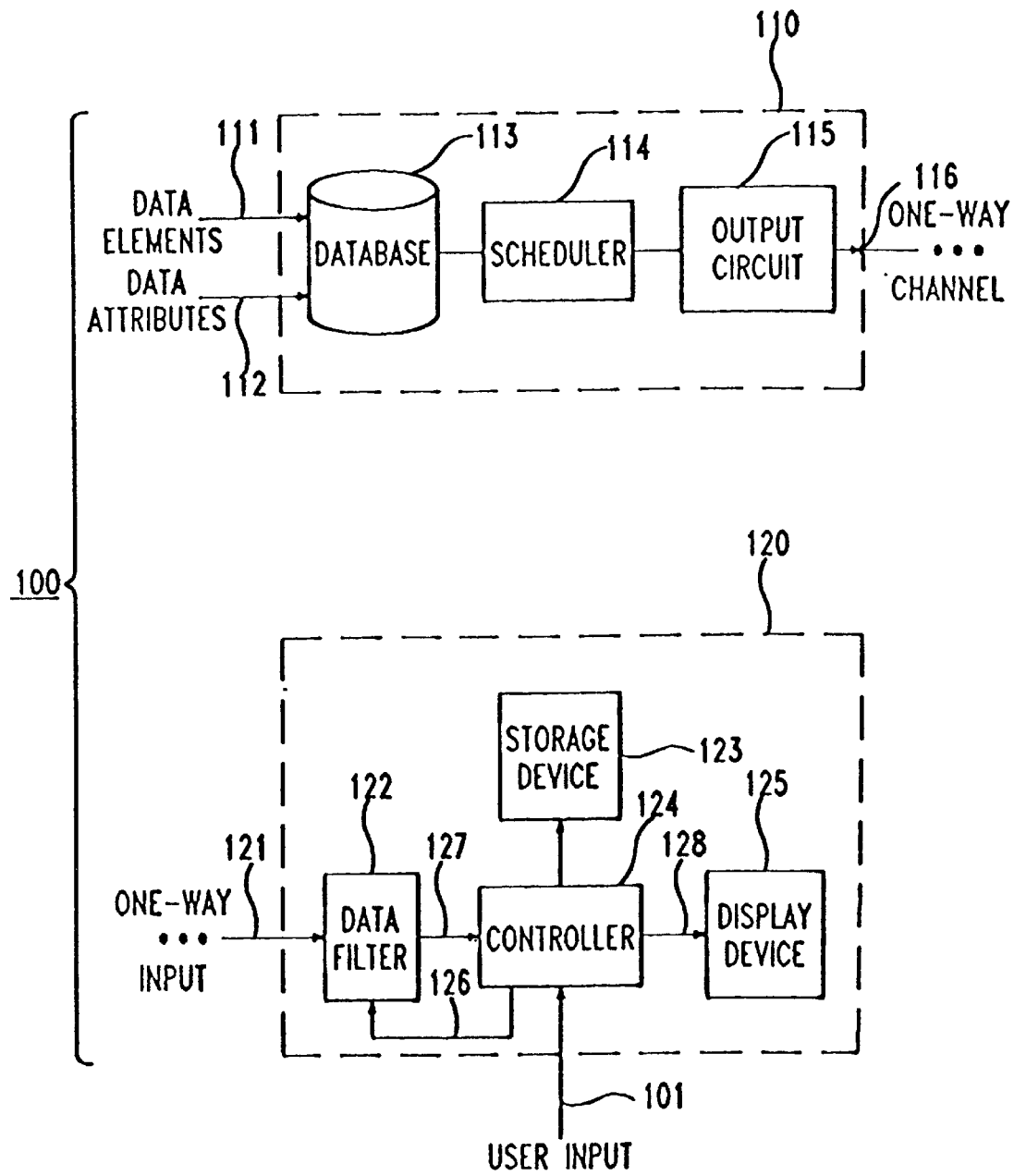
FIG. 1 illustrates a high-level block diagram of the transmitter-receiver combination in accordance with an illustrative embodiment of the present invention.

With reference to FIG. 1, there is shown in high-level block diagram form the Broadcast Interactive Multimedia (hereinafter BIM) system 100 in accordance with an illustrative embodiment of the present invention. Transmitter 110 is composed of database 113, scheduler 114, and output circuit 115. Data elements 111, which are generally prepared off-line and then made available on a timely basis for broadcast to users of BIM system 100, are entered and stored in database 113, which is typically a large storage medium having a storage capacity in the gigabytes range. Data elements can be comprised of, for example, text, formatted text, sounds, animation, page layout data, video clips, and so forth.

Exemplary data elements include: newspaper columns; magazine articles; TV schedules; technical papers; and stock market data. Data attributes 112 are also entered into database 113. One or more data attributes 112 may be associated with each corresponding data element. A data attribute describes the relative value of the corresponding data element to a known set of user interest groups. For example, suppose three interest groups are characterized by the following descriptors: Politics; Sports; Financial. If a data element is a newspaper editorial about the salary of baseball players and the impact of anti-trust laws on such salaries, then the following set of relative values for the above descriptors may attached to the newspaper editorial: {0.5, 1.0, 0.75}. The data attributes associated with the corresponding data element are prepared by an entity that has knowledge of the given set of user interest groups as well as the wherewithal to rank the relative importance of the data element to the user groups. More detailed information about the user interest groups and relative values is presented in the sequel.

The data element/data attributes are broadcast on a rotating basis as effected by scheduler 114. The repetition rate of a particular data element is a function of the size and interest value of the given data element. The element/attribute combination is broadcast to the user community via output circuit 115 and communications port 116. There are various techniques to broadcast (i.e., transmit over a one-way channel) the element/attribute combinations from transmitter 110, including terrestrial TV, satellite TV, and cable TV. Circuit 115 is then matched to the specific broadcast technique selected for a given application; for instance, circuit 115 and port 116 may be implemented as a high-power TV transmitting antenna for terrestrial, over-the-air TV.

Each user receiver 120 is composed, broadly, of: data filter 122; controller 124 coupled to filter 122; storage device 123 coupled to controller 124; and display device 125 connected to controller 124. In addition, a user of each particular receiver provides input to controller 124 via input channel 101. Data element/attribute input to receiver 120 is supplied by one-way channel 121, which for the case of terrestrial TV, is typically a VHF/UHF receiver/demodulator. Data filter 122 selects only those data elements which are likely to be of greatest value/interest to the specific user, and stores these selected data elements in storage device 123; device 123 has a storage capacity which is generally in the tens of megabytes range. Which data elements to select are determined by processing the corresponding data attributes with algorithms stored within controller 124, and then selecting those data elements that meet pre-determined criteria as guided by the processing results. The data attributes, as well as the data elements, are provided to controller 124 over interconnection path 127; information on those data elements to select is provided over feedback path 126 from controller 124 to data filter 122. The algorithms are dynamically changing based both upon direct user input and inferences deduced from the selection pattern of the specific user. Details about the dynamic nature of the selection and inference processes are discussed in detail shortly.

The user navigates the stored data elements, via user input over channel 101, through the use of multimedia navigational software also stored in controller 124. The results of user navigation actions are displayed on display device 125 as provided via control bus 128 between controller 124 and device 125. Navigation is fully interactive as long as the user is navigating data elements that have previously been stored locally in storage device 123. Navigating to an element which has a reference only but is not physically present in the local storage produces an indication, typically a message on display device 125, that informs the user when the requested data element will become available.

An example of a reference is best illustrated by initially considering a data element which provides a guide to TV programs by date and time-of-day. Each listing on the guide is generally hyperlinked to more detailed information about the given listing. For example, the user may select from the guide a specific comedy show and ask to have more detailed information presented about that show through a hyperlink to the data element having that detailed information—such additional information might include a summary of the theme of the show for that selected date and time. In one possible scenario, this additional information may not have been stored because it had been determined through the algorithmic processing by controller 124 that this particular user was not as likely to select this additional information over other stored information. Thus, the listing of the comedy show on the TV guide includes a reference indication that more detailed information is available, but actually the information is not available until a later time; the more detailed information will now be selected by data filter 122 during the next broadcast cycle because the user has, by the selection pattern, caused the processing algorithms to dynamically change the selection strategy.

Receiver Circuit Embodiment

Figure 2:
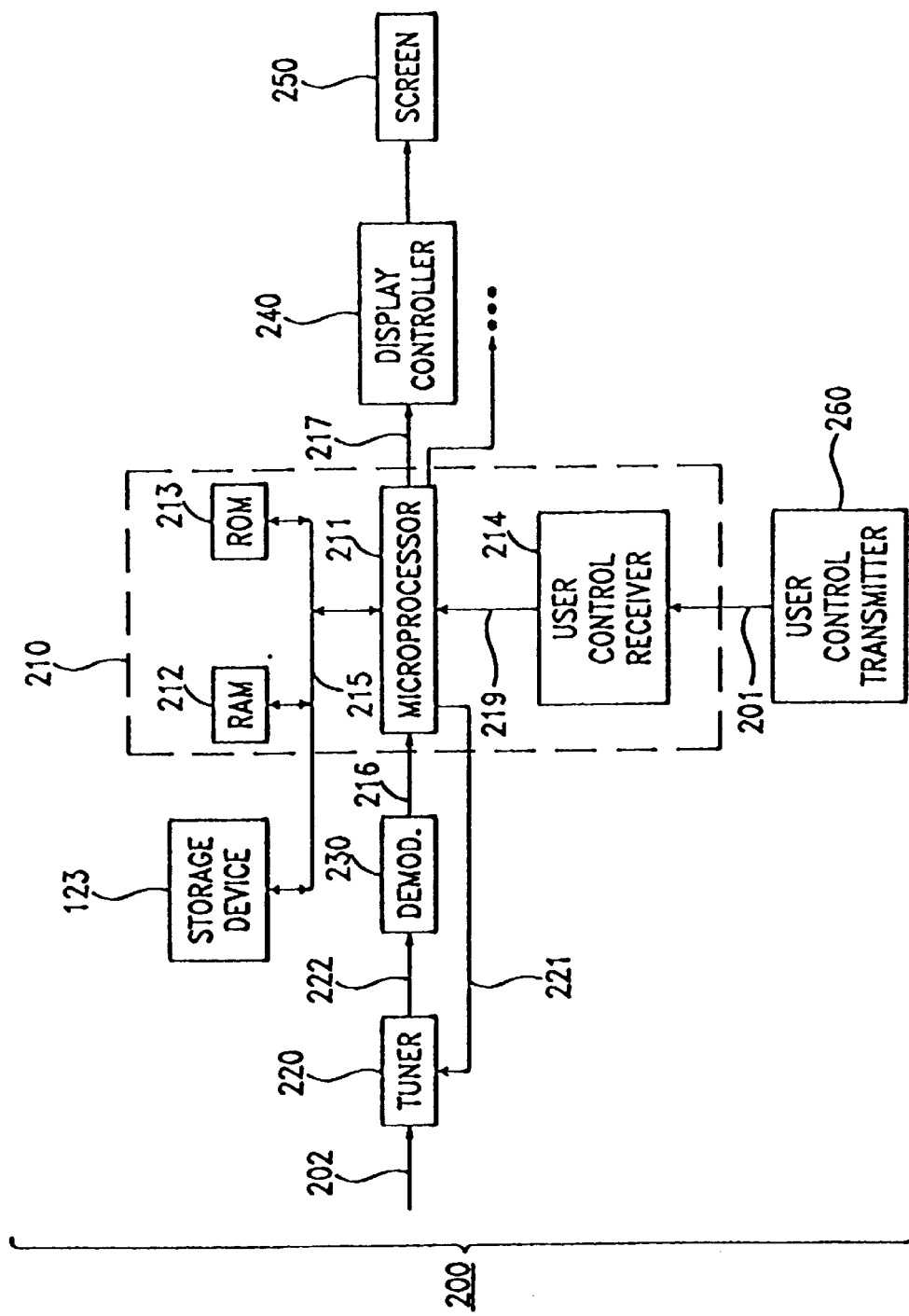
FIG. 2 illustrates a circuit-level block diagram of an illustrative implementation of the receiver of the present invention as a stand-alone unit.

Receiver 120 of FIG. 1 may be realized as either a stand-alone circuit or integrated into a television receiver. An illustrative embodiment of a stand-alone arrangement is depicted by the circuit-level block diagram of FIG. 2. In FIG. 2, receiver 200 is arranged at its front end with the cascade of tuner 220 and demodulator 230. Tuner 220 tunes to a particular incoming channel arriving on one-way communication path 202. The tuning effected by tuner 220 may be accomplished by direct user control or automatically by software executing in microprocessor 211; in either case, control information is passed to tuner 220 via control path 221. Demodulator 230: equalizes and recovers timing from the modulated signal delivered from tuner 220 over path 222; extracts the data element and data attribute information from the modulated signal; and effects conventional forward error correction of the modulated signal.

The demodulated, error-corrected data information is delivered to microprocessor 211 via path 216. Microprocessor 211: executes software which implements the data storage strategy; receives input from user control receiver 214 via path 219; executes software which processes the user information received from control receiver 214; provides the drive signal information to display controller 240; and manages the overall receiver functions. Directly coupled to microprocessor 211, via bus 215, are ROM 213 and RAM 212 which serve as the software memory and data memory for microprocessor 211, respectively. The quantities stored in RAM 212 are used for computation of decision, inference, and probability functions presented and discussed shortly.

Also coupled to bus 215 is storage device 123, which provides "mass" storage for data elements. Storage device 123 may, for example, be implemented as silicon memory (RAM, EEPROM, FlashPROM), or magnetic memory (hard disk). The size of memory will vary based on the application of interest, and may be expandable to accommodate a suitable number of applications.

Display controller 240, responsive to microprocessor 211 via path 217, provides the graphic capability for receiver 200. Controller 240 provides the necessary input to screen 250, which may be a CRT, LCD, or other suitable display unit.

User control transmitter 260 enables user interaction with receiver 200, and particularly the graphic display and control software executed by microprocessor 211. User control transmitter 260 may be a wired or a wireless (e.g., IR or RF) remote control, pointing, and data entry device exemplified by a computer keyboard/mouse combination. Companion user control receiver 214 is suitably arranged to recover information provided by transmitter 220 over input path 201.

In FIG. 2, dashed block 210 is shown as encompassing microprocessor 211, RAM 212 and ROM 213, and user control receiver 214. A comparison of FIG. 2 to FIG. 1 indicates that the components included within block 210 essentially implement the data filter 122 and controller 124 functions generically discussed with respect to the operation and interaction the circuitry comprising receiver 120 of FIG. 1.

(At this juncture, it is also instructive to point out that if receiver 200 is integrated into a television receiver, tuner 220 and display 250 would most efficiently be shared with like standard television functions. Moreover, the user control transmitter/receiver pair 214 and 260 may be implemented as part of a unified television/VCR remote control unit.)

Receiver Storage Strategy

The following presents an illustrative embodiment of functions evaluated by controller 124 of receiver 120. Certain terms are defined initially for later use in computation of decision, inference, and probability functions set forth below:

| | |
|---|---|
| N | the number of data elements currently stored in storage device 123 |
| $E_n$ | the $n^{th}$ element which is currently stored in storage device 123, where $1 \leq n \leq N$ |
| $P_n$ | an estimate of the probability that receiver 120's user will attempt to access data element $E_n$; $P_n$ is computed by controller 124 based on user actions, as presented shortly. |
| K | the number of categories defined within the BIM system 100 at a given instant of time (this number may change as the BIM system evolves over time). |
| $C_k$ | the $k^{th}$ cateogry currently defined within the BIM system, where $1 \leq k \leq K$. |
| $i_k$ | an estimate of the level of user interest in the $k^{th}$ category for receiver 120's user, wherein $0 \leq i_k \leq 1$ (i.e., 0% to 100%); $i_k$ is updated on an ongoing basis by an alogrithm presented shortly. |
| $m_{n,k}$ | a measure of the likelihood that the user who is interested in category $C_k$ will be interested in data element $E_n$. This information is transmitted along with $E_n$ as a data attribute, Without loss of generality, it may be assumed that $0 \leq m_{n,k} \leq 1$, where a higher value corresponds to a higher likelihood of interest. |
| $\xi_n(t)$ | a function which describes the relative value of the $n^{th}$ data element as a function of its age. A description of this function is transmitted along with $E_n$ as a data attribute; this function is generally normalized to fall between 0 and 1, with 1 being most useful. |

The Store/Discard Decision

Whenever a new data element, designated $E_{new}$ is received by receiver 120, the following quantity is computed:

$$f_{new} = \max_{1 \leq k \leq K} [(m_{new,k})(i_k)],$$

where $f_{new}$ is the estimate to the user's interest in the new data element $E_{new}$.

Next, another quantity, designated $\beta_{new}$, is computed according to the relation:

$$\beta_{new} = (f_{new})\, (\xi_{new})(t)),$$

where time t is the current time and $\beta_{new}$ is the estimate to the user's interest in the new data element with the timeliness of the data element taken into account.

The value of $\beta_{new}$ is then used in the following computation:

$$P_{new} = \Psi[\beta_{new}],$$

where $\Psi[.]$ represents an estimate of a mapping function which maps $\beta_{new}$ to the probability that the user will request the data element; the value $P_{new}$ thus represents an estimate of this probability.

Finally, compute $P_n$ according to the following formula:

$$P_n = \Psi[(f_n)(\xi_n(t))] \text{ for } 1 \leq n \leq N.$$

The new data element $E_{new}$ is accepted if $P_{new}$ is greater than the sum over the set of $P_n$ corresponding to the smallest set of least desirable data elements that would be required to be deleted to accommodate the new data element $E_{new}$.

Inferring User Preferences

For each data element in BIM system 100, receiver 120 tracks whether or not the user ever had the opportunity to request each element through a hyperlink. Each time the user requests a data element update, the user interest profile represented by the $i_k$'s is correspondingly updated according to the following relation:

$$i_k \leftarrow (1-\mu_Y)i_k + \mu_Y m_{n,k}$$

for $1 \leq k \leq K$, where n is the index of the requested data element and $\mu_Y$ is a constant which controls the influence of a single affirmative choice on the interest estimate.

Just prior to deleting a data element, a check is made to see whether the data element was ever requested by the user. If the data element was never requested, even though a user could have done so through a hyperlink, then the following update is performed:

$$i_k \leftarrow \begin{cases} (1-\mu_R)i_k + \mu_R(1-m_{n,k}), & \text{for } m_{n,k} > 0.5; \\ i_k, & \text{otherwise.} \end{cases}$$

for $1 \leq k \leq K$, where $\mu_R$ is a constant which controls the influence of explicit user non-interest on the estimate.

If the data element was never requested, but the user never had the opportunity to request it through a hyperlink, then the following update is performed:

$$i_k \leftarrow \begin{cases} (1-\mu_A)i_k + \mu_A(1-m_{n,k}), & \text{for } m_{n,k} > 0.5; \\ i_k, & \text{otherwise.} \end{cases}$$

for $1 \leq k \leq K$, where $\mu_A$ is a constant which controls the influence of explicit non-availability of the data element on the estimate.

Procedure for Converting Interest Measures to Probabilities

Receiver 120, via controller 124, has the capability to track and store whether or not a given data element has ever been requested by the user. Then, just prior to deleting the $j^{th}$ data element, the following parameter is computed:

$$\lambda_j = \frac{f_j}{(t_1-t_0)} \int_{t_0}^{t_1} \xi_j(t)dt,$$

where $t_0$ is the time the $j^{th}$ data element was received, and $t_1$ is the time the $j^{th}$ data element was purged;

$\lambda_j$ is a measure of time-adjusted interest that the user had in the data element about to be deleted.

It is further presumed that the $\lambda_j$'s have been stored for a significant number of past data elements, along with whether or not the elements were requested by the user. Then $$\psi[x] = \int_{x-d}^{x+d} \sum_{n=1}^{N} I(n)\delta(\lambda-\lambda_n)d\lambda \div \int_{x-d}^{x+d} \sum_{n=1}^{N} \delta(\lambda-\lambda_n)d\lambda$$

where d represents a smoothing interval and I(n) is an indicator function defined by:

$$I(n) = \begin{cases} 0 \text{ if data element } n \text{ never requested;} \\ \text{or} \\ 1 \text{ if data element } n \text{ was requested,} \end{cases}$$

and where $\delta(\lambda)$ is the well-known Dirac delta function. It is noted that d should be chosen sufficiently large that the denominator in the relation for $\Psi[x]$ is never zero. If a smaller value of d is used, then interpolation can be used between points where the function is defined. Straightforward generalizations to the relation for $\Psi[x]$ include convolving a lowpass kernel against the function.

Based on the foregoing discussion, an illustrative layout 300 of the data attributes associated with a data element as well as the $n^{th}$ data element itself may be pictorially represented by FIG. 3.

(Although the discussion of this section has been couched in terms of the general block diagram of FIG. 1, it is readily appreciated by those with ordinary skill in the art that the elements of FIG. 2 have also been arranged to carry out the same computations.)

Generalized Data Attributes and Generalized Functions

The foregoing sections have illustrated possible decision, inference, and probability functions and the type of data attributes that are attached to each data element to evaluate such functions. However, as alluded-to, data attributes may be expressed in a variety of ways which still fall within the spirit and scope of the present invention.

The most important data attributes to be attached to each data element to help in the selection process are values which indicate what groups of users might find the data interesting (interest groups or "IG"s), as well as a relative measure of how interesting each group would find the data (interest level or "IL"). Thus, broadly, each data element would include a list of interest groups and interest levels for each of these groups which is the $m_{n,k}$ list exemplified above.

The most general notion regarding $\xi_n(t)$ is that it represents usefulness or utility of a data element as a function of time, which typically tends to decrease over time. Utility functions generally normalized to range from 1 (most useful) to 0 (no utility). Examples of typical functions include decaying exponentials or piecewise functions (e.g., linear, polynomial) and would be coded using a compact representation. Usefulness functions are then used in computations by controller 124 to decide which data elements, if any, to delete-to make room for new data elements.

Interactive browsing, besides being fostered by sending data from transmitter 110 of FIG. 1 on a repeating basis, can further be facilitated by associating an identifying label ("identifier") with each data element. Other data elements can then contain hyperlinks pointing to these identifiers. However, besides this conventional pointer information, a hyperlink would also contain an indication of the time that the "pointed-to" data element would next be sent by transmitter 110. Thus, if during browsing of the data elements stored in storage device 123, the user selects a hyperlink that points to a data element which is not in storage, the user may be informed of when the desired data element will become available; the user may choose to wait if the duration is acceptable, or to perform other selection activities in the interim.

In addition, another attribute that may be attached to each data element is an indication of how often that data element is repeated. Controller 124 may then use this information as part of a "desirability" function defined in such a way that more frequently sent data elements would have less need to be stored locally in storage device 123.

Since data elements compete for space in local storage device 123, each data element must be ranked in order of relative importance, with those data elements at the bottom of the rank order being the first to be deleted to make storage space available for higher ranked data elements. The ranking of data elements, including both new data elements being received and data elements already stored, is based on these data attributes (interest groups; interest levels; utility function; repetition rate; size of data element). All of the data attribute information is utilized in generally defining a desirability index. The desirability index of the new data element is evaluated against indices of stored data elements to decide whether to store the new data element and which stored data elements to remove. The layout of a more general data element/data attribute list 400 is shown in FIG. 4 for comparison and contrast to FIG. 3; in fact, FIG. 3 is a subset of the information contained in FIG. 4. The $m_{n,k}$ values of FIG. 3 are equivalent to the $IG_j$ $IL_j$ values of FIG. 4.

In a hyperlinked multimedia environment, navigation is typically done in one of several ways: (a) through the hyperlink (typically a marked word, picture, or button responds to a pointer click by accessing and presenting a new data element in the database); (b) moving backward and forward, one page at a time, through a recently traversed hyperlinked path; and (c) using a direct access mechanism, such as a previously assembled "hot list" or map of the database, to bring a specific item from within the database. In most circumstances, one or more of these methods is satisfactory. There are, however, situations which benefit from a more intelligent navigation strategy—for example, in the case of reading a newspaper article, where many important words are hyperlinked to a dictionary or glossary within the database. Within each of these glossary entries might be hyperlinks to more detailed, supportive or collateral information. In this situation, it is convenient to return quickly and directly to the original article, bypassing the original "downward" path, that is, without the need to traverse backwards through the original path. This is accomplished by marking, during database preparation, certain data elements or sequences of data elements as "special" in that the special data elements may be read through one-at-a-time in the downward path, but the return point is directly to these special data elements. So marked, these special data elements produce "Direct Return" buttons in the presentation of hyperlinked data elements stemming from these special data elements; thus, selecting such a "Direct Return" button returns immediately and directly to the specially marked data element (s).

Flow Diagrams

Before commencing discussion of the flow diagrams relating to the so-called "interaction" engine, it is necessary to first describe two special types of data elements that are important in multimedia browsing environments: (1) the "page"—a composite data element in the form of a display on screen 250 containing other data elements such as text, images, and "buttons" that can be pushed in a figurative sense, wherein each of the other data elements might contain a hyperlink to yet other data elements or pages; and (2) the "home page"—a page which provides a useful entry point into a topic area.

Receiver 120 could store, based on the interest groups associated with the user, several sets of data elements that are disjoint. For example, receiver 120 might store a set of ten pages on tennis and twenty pages on stock quotes, with no hyperlink to navigate between them. To create a meaningful browsing environment, receiver 120 constructs a synthetic home page above these two sets of data elements that allows the user to access either set.

In addition, pages could include a parameter that indicates how useful the given page is as a home page. Including such a parameter would allow receiver 120 to select the best home page for tennis and the best home page for the stock market quotes as the targets for the synthetic home page hyperlinks. Accordingly, receiver 120 would have available sufficient information to decide which is the top-level page of the data elements arriving over an incoming one-way channel.

Figure 5:
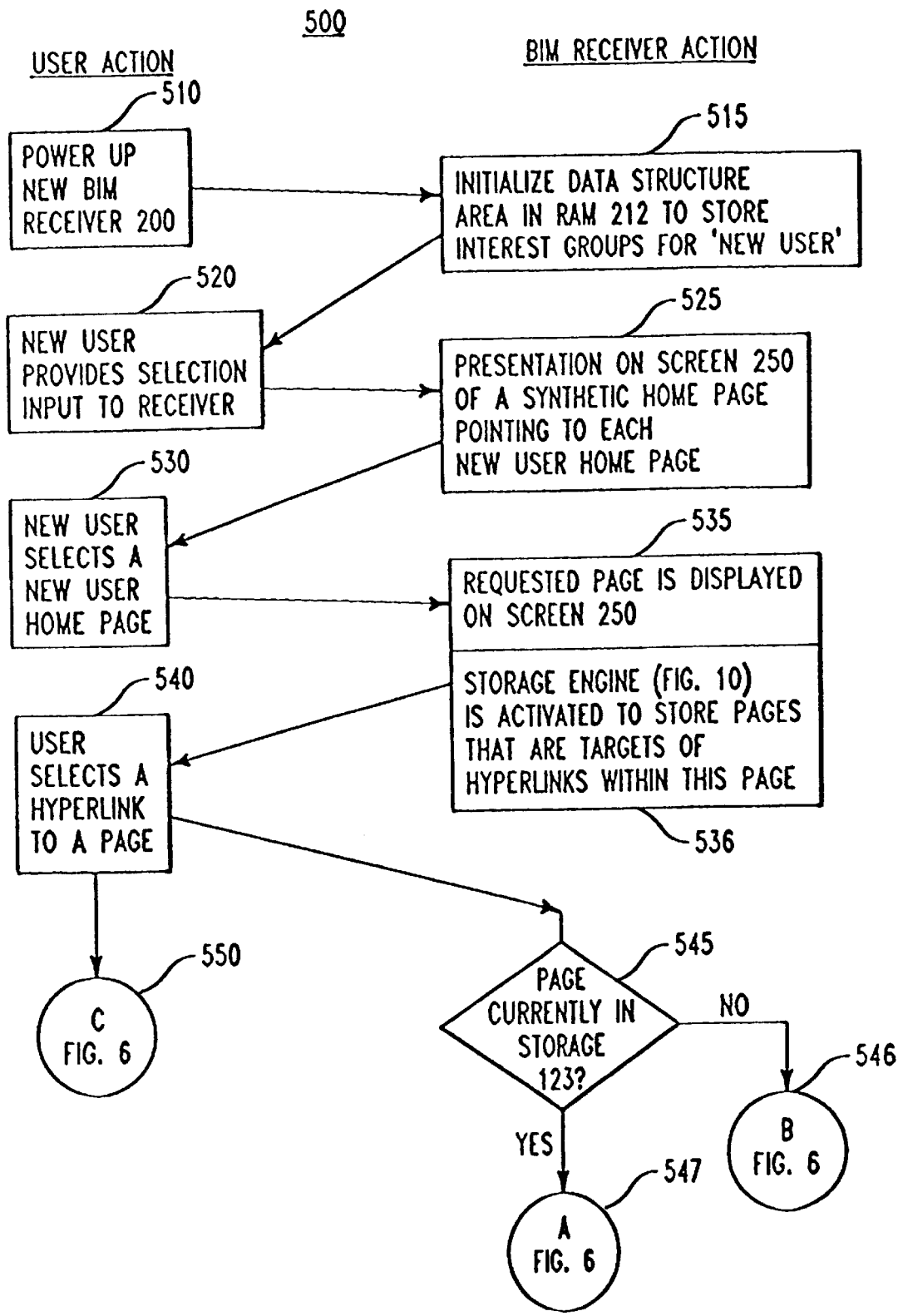
FIGS. 5 and 6 depict an illustrative flow diagram of the interaction engine executed in the receiver in response to user input.
Figure 7:
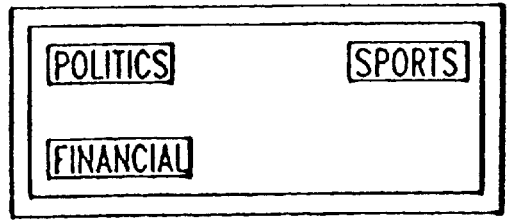
FIG. 7 illustrates a display of a synthetic home page on the display device.

Flow diagram 500 of FIG. 5 depicts actions by the user (left side of flow diagram) and the resultant processing in microprocessor 211 invoked by such user actions (right side of flow diagram). Referring to FIG. 5 in conjunction with FIG. 2, block 510 depicts that the initial action of a new user is to power up receiver 200. In response to this action, the processing set forth in block 515 is invoked, namely, a user interest data storage area in RAM 212 is initialized and stores data indicating that the user is interested in certain "new user" interest groups. These groups could, for example, be default interest groups; on the other hand, upon initialization, a new user might be requested to fill in an on-line questionnaire for the purpose of determining the new user profile of desired interest groups. In any case, as previously elucidated, information about user preferences is learned as the new user interacts with receiver 200. The user, as represented by block 520, provides input to receiver 200 which is used in the selection process. Initially presented to the user on display screen 250 is the synthetic home page. An exemplary synthetic home page for this particular new user is depicted on the display of FIG. 7—it is seen that this user has an initial user profile wherein the interest categories are Politics, Sports, and Financial. The rectangle encompassing each interest category is representative of a "button" that can be selected to display the home page associated with the interest category. In fact, the next user action is the selection of a home page from the display of FIG. 7, as depicted by user activity block 530.

Figure 6:
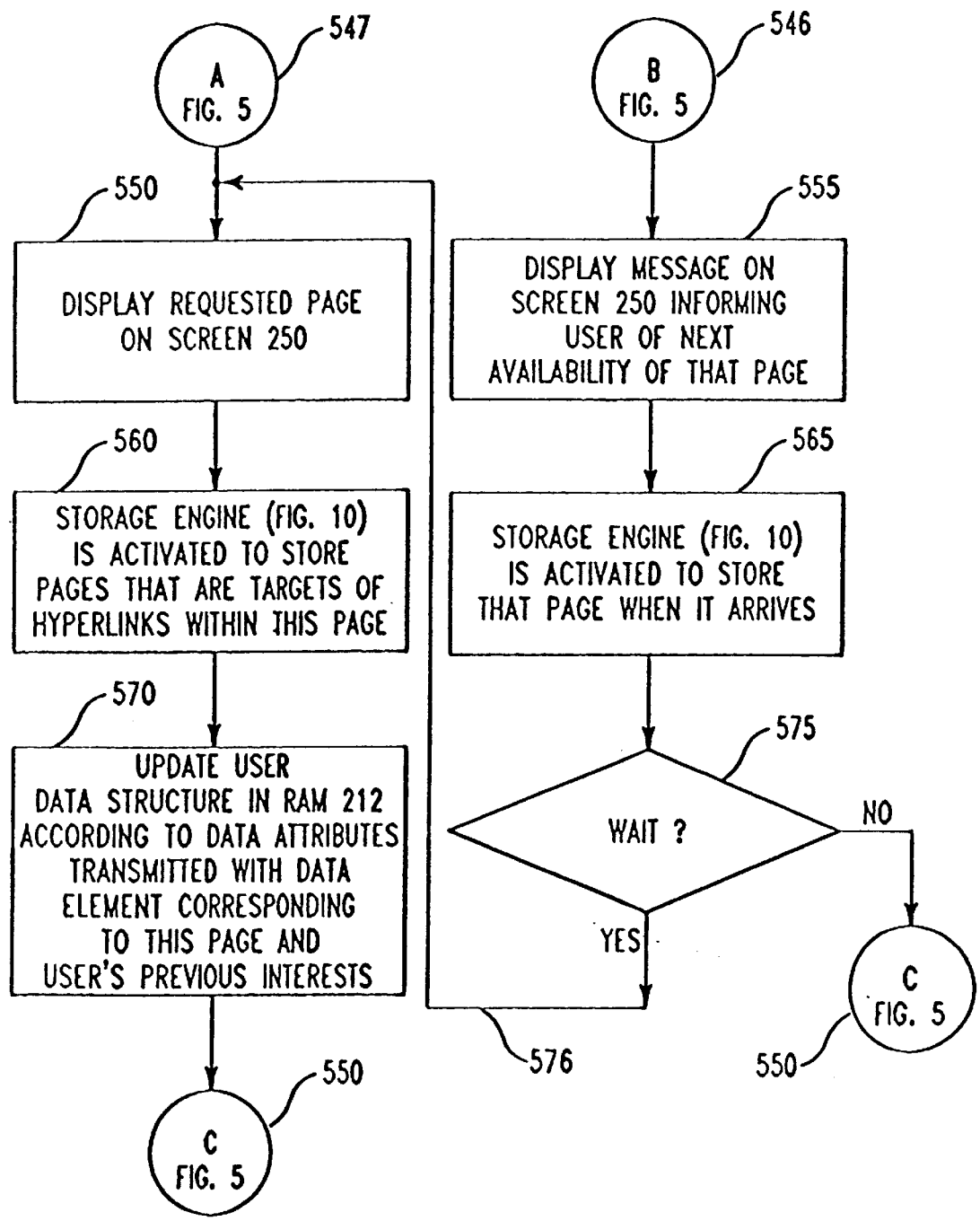
Figure 8:
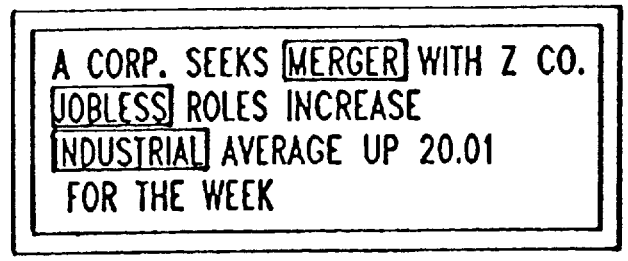
FIG. 8 illustrates a display of a home page on the display device resulting from a selection from the home page of FIG. 7.

In response to this action, as illustrated by processing block 535, the desired home page is displayed on screen 250. As illustrated in FIG. 8, the user has selected the Financial category on the synthetic home page; FIG. 8 depicts, for example, headlines of newspaper articles that have most recently appeared. Again, the rectangle encompassing certain words in the display of FIG. 8, such as "Merger" or "Jobless", are buttons that represent hyperlinks to other data elements, that is, pages of interest to the user. This processing is shown by block 536 in which the 'storage engine' (to be discussed shortly) is activated to store pages that are targets of hyperlinks within the home page selected by the user. The user is now in a position to select one of the hyperlinks. Two cases must be considered upon user selection of a hyperlink; these cases are represented by decision block 545. It may be that the selected page is already present in storage device 123 ("Yes" branch of decision block 545), in which case processing by block 550 in FIG. 6 is commenced. In the other case, the page selected is not available in storage device 123 ("No" branch of decision block 545), in which case processing by block 555 in FIG. 6 is invoked.

Figure 9:
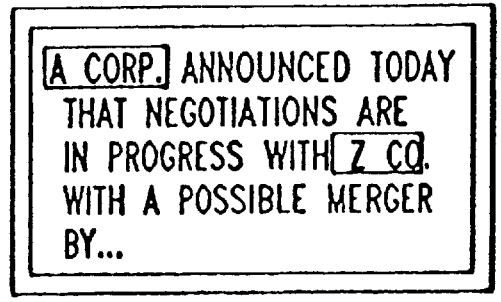
FIG. 9 illustrates a display of the another page on the display device resulting from a selection of a hyperlink on the page of FIG. 8.

Assuming the presence of the page in storage device 123, processing block 550 immediately displays the requested page on screen 250. As illustrated in FIG. 9, the user has, for example, selected the "Merger" hyperlink, so the article corresponding to this hyperlink is displayed on screen 250. Next, processing by block 560 activates the storage engine to store pages that are targets of hyperlinks within this just-selected page. For instance, pages associated with the hyperlink "A Corp." are target pages. Lastly, processing represented by block 570 is executed in microprocessor 211 to update that data structures in RAM 212 associated with this particular user; such processing was exemplified by the inference and probability functions of the previous section. Control of the processing is returned to the user via block 540 (exit point 550 in FIG. 6 and entry point 550 in FIG. 5).

If the page is not present in storage device 123 upon user selection, processing block 555 depicts that a message is displayed on screen 250 informing the user of the next availability of that page; it is recalled that the information about the availability is part of the "pointed-to" hyperlink information. Next, as processing block 565 indicates, the storage engine is activated to store the desired page when it arrives. Decision block 575 is invoked to determine whether or not the user will wait for the page to be displayed. If the response is the user will wait ("Yes" branch of decision block 575), then processing block is entered to display the page when it arrives after a delay period. If the user wishes to complete other activities ("No" branch of decision block 575), then the user is returned to, for example, processing block 540 of FIG. 5. One of ordinary skill in the art will readily ascertain that other entry points upon leaving the "No" branch of the "Wait" query are also possible, and the entry to block 540 via entry point 550 is merely illustrative.

Figure 10:
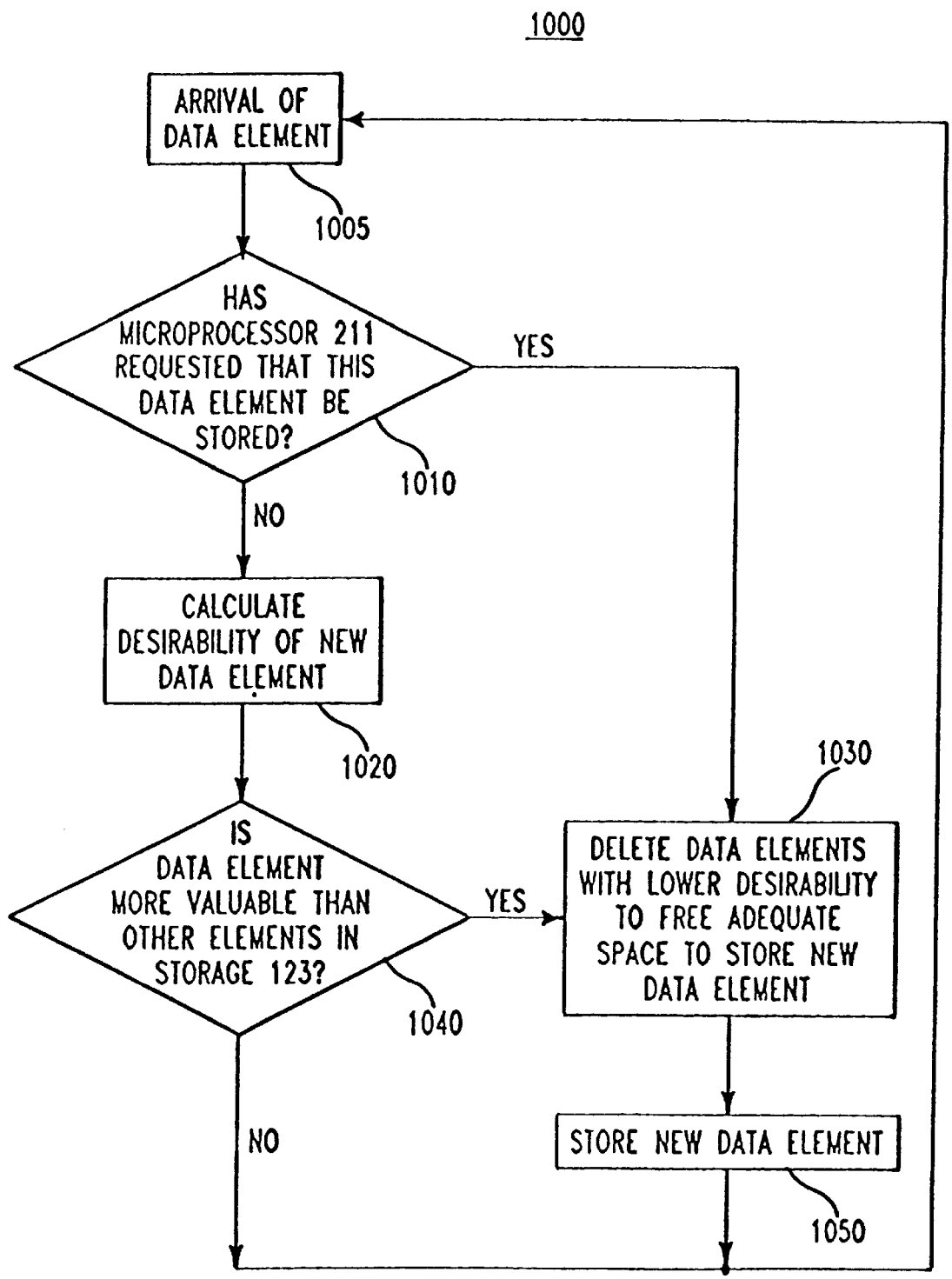
FIG. 10 depict an illustrative flow diagram of the storage engine executed in the receiver.

Flow diagram 1000 in FIG. 10 depicts the process flow of the exemplary 'storage engine.' Processing by the storage engine is initiated upon the arrival of a data element at processing block 1005. As a first step, processing by decision block 1010 determines whether or not microprocessor 211 has requested storage of this data element. If the data element is to be stored ("Yes" branch of block 1010), control is passed to processing block 1030, wherein a suitable number of data elements with lower desirability are deleted to free adequate storage space in storage device 123 to store the newly-arriving data element, which occurs via the processing by block 1050. This processing branch is completed by returning to block 1005 to await the arrival of a new data element.

If there has been no prior request by microprocessor 211 to store the incoming data element ("No" branch of block 1010), the desirability of the newly-arriving data element is computed by the processing of block 1020. Next, decision block 1040 is entered to determined if this data element is more valuable than other data elements in storage device 123, that is, is this recently computed desirability index greater than other desirability indices of data elements already in storage. If "No", then no further processing is effected, and control returns to block 1005. If "Yes", then processing block 1030 is entered, and processing proceeds as discussed above for this block.

Whereas the foregoing illustrative embodiment, and associated flow diagrams, have been presented in terms of stand-alone components such as controller 124, storage device 123, screen device 125, and so forth, it is clear to one with ordinary skill in the art that other embodiments are readily recognized, including the use of a general purpose personal computer or workstation which has been suitably arranged with the appropriate application software to provide the required processing and display functions. In addition, whereas the channel linking the transmitter and receiver has been illustrated as being a one-way channel, such a channel is not a strict requirement for the present invention, that is, the principles of the present invention may also be utilized with a two-way channel.

Also, whereas the illustrative embodiments have been presented in terms of repetitively communicating the data elements, it is within the contemplation of one of ordinary skill in the art that the BIM technique may be used in a system wherein data is sent on demand to any user who requests such data via a two-way channel. Other users' terminals could then store the data that is meant for the user who requested such data if it is determined that the other users would be interested in such data via, for example, reference to the user profiles of these users.

Finally, since it is contemplated that display device 125 may be, for example, a standard TV receiver in which a display window is overlaid on the screen, control of the physical aspects of display device 125 (e.g., channel selection, volume control) may be effected directly by controller 124 in response to special data elements which contain information to control the physical parameters of display device 125.

Although various embodiments which incorporate the teachings of the present invention have been shown and described in detail herein, those skilled in the art can readily devise many other varied embodiments that still incorporate these teachings.

We claim:

1. A method for generating and broadcasting a common database composed of data elements to a plurality of users, the method comprising the steps of defining interest categories for the common database which express the collective interest of the users, assigning at least one of the interest categories to each of the data elements, identifying data attributes for each of the data elements, one of the data attributes being a numerical interest level for at least one of the interest categories such that each numerical interest level expresses an estimate of the collective interest of the users in a corresponding one of said at least one interest categories, grouping the data elements with the corresponding interest categories and the corresponding data attributes to thereby produce the common database, and broadcasting the common database to the plurality of users.

2. The method as recited in claim 1 wherein at least one data element is indicative of physical parameters to control a display device deployed by each of the users.

3. The method as recited in claim 1 wherein another of the attributes is a utility attribute which expresses the usefulness of each of the data elements as a function of time.

4. A method for generating and broadcasting a common database composed of data elements to a plurality of users, the method comprising the steps of defining interest categories for the common database which express the collective interest of the users, assigning at least one of the interest categories to each of the data elements, identifying data attributes for each of the data elements, one of the data attributes being a numerical interest level for at least one of the interest categories such that each numerical interest level expresses an estimate of the collective interest of the users in a corresponding one of said at least one interest categories, and another of the attributes being a special page data element with the associated data attribute of said page data element indicating the relative value of the page data element as a home page, grouping the data elements with the corresponding interest categories and the corresponding data attributes to thereby produce the common database, and broadcasting the common database to the plurality of users.

5. Circuitry for generating and broadcasting a common database composed of data elements to a plurality of users, the circuitry comprising definitional means for defining interest categories for the common database which express the collective interest of the users, assignment means for assigning at least one of the interest categories to each of the data elements, identification means for identifying data attributes for each of the data elements, one of the data attributes being a numerical interest level for at least one of the interest categories such that each numerical interest level expresses an estimate of the collective interest of the users in a corresponding one of said at least one interest categories, grouping means for grouping the data elements with the corresponding interest categories and the corresponding data attributes to thereby produce the common database, and means for broadcasting the common database to the plurality of users.

6. A method for communicating data elements from a common database to each of a plurality of users of the data elements, the method comprising the steps of:

(a) defining interest categories for the database which express the collective interest of the users;

(b) assigning at least one of the interest categories to each data element;

(c) identifying data attributes for each of the data elements, the step of identifying including the step of defining an interest level for at least one of the interest categories wherein each interest level expresses an estimate of the collective interest of the users in a corresponding one of said at least one interest categories;

(d) communicating each data element and its associated data attributes to the users;

(e) generating a user profile indicative of data elements of interest to each user;

(f) selecting and locally storing data elements of interest to each user in correspondence to the selections of each user with respect to the communicated data elements and with reference to the user profile; and (g) modifying the user profile in correspondence to the data attributes of data elements selected by each user, and returning to step (f).

7. The method as recited in claim 6 wherein the step of identifying further includes the step of defining a utility attribute which expresses the usefulness of said each of the data elements as a function of time.

8. The method as recited in claim 6 wherein at least one data element is indicative of physical parameters to control a display device and further including the step of displaying the locally stored data elements on the display device in response to user selection of the locally stored data elements, the step of displaying including the step of controlling the display device with the physical parameters expressed by said at least one data element.

9. Circuitry for communicating data elements from a common database to each of a plurality of users of the data elements, the circuitry comprising:

(a) definitional means, coupled to the database, for defining interest categories for the database which express the collective interest of the users;

(b) assignment means, coupled to the definitional means, for assigning at least one of the interest categories to each data element;

(c) identification means for identifying data attributes for each of the data elements, the identification means including interest level means for defining an interest level for at least one of the interest categories wherein each interest level expresses an estimate of the collective interest of the users in a corresponding one of said at least one interest categories;

(d) communication means, coupled to the database, for communicating each data element and its associated data attributes to the users;

(e) generator means for generating a user profile indicative of data elements of interest to each user;

(f) means, coupled to said generator means, said identification means, and said communication means, for selecting and for locally storing data elements of interest to each user in correspondence to the selections of each user with respect to the communicated data elements and with reference to the user profile; and (g) modification means, responsive to said means for selecting and for storing and coupled to said generator means, for modifying the user profile in correspondence to the data attributes of data elements selected by each user.

10. A method for receiving data elements by each of a plurality of users of the data elements, the data elements being communicated from a common database wherein: (i) interest categories for the database are defined which express the collective interest of the users; (ii) at least one of the interest categories is assigned to each data element; and (iii) data attributes for each of the data elements are identified, one of the data attributes being an interest level for at least one of the interest categories such that each interest level expresses an estimate of the collective interest of the users in a corresponding one of said at least one interest categories, the method comprising the steps of:

(a) generating a user profile indicative of data elements of interest for each particular user;

(b) selecting and locally storing data elements of interest for each particular user in correspondence to the selections of each user with respect to the communicated data elements and with reference to the user profile; and (c) modifying the user profile in correspondence to the data attributes of data elements selected by each particular user, and returning to step (b).

11. The method as recited in claim 10 wherein at least one data element is indicative of physical parameters to control a display device and further including the step of displaying the locally stored data elements on the display device in response to user selection of the locally stored data elements, the step of displaying including the step of controlling the display device with the physical parameters expressed by said at least one data element.

12. The method as recited in claim 10 wherein another of the attributes is a utility attribute which expresses the usefulness of each of the data elements as a function of time, and wherein the step of modifying includes the step of modifying the user profile in correspondence to the utility function.

13. A method for receiving data elements communicated from a common database to each of a plurality of users of the data elements, the data elements from the common database being arranged as follows: (i) interest categories for the database are defined which express the collective interest of the users; (ii) at least one of the interest categories is assigned to each data element; and (iii) data attributes for each of the data elements are identified, one of the data attributes being an interest level for at least one of the interest categories wherein each interest level expresses an estimate of the collective interest of the users in a corresponding one of said at least one interest categories, and another of the attributes being at least one data element is a special page data element and the associated data attribute of said page data element indicates the relative value of the page data element as a home page, the method comprising the steps of:

(a) generating a user profile indicative of data elements of interest for each user;

(b) selecting and locally storing data elements of interest for each user in correspondence to the selections of each user with respect to the communicated data elements and with reference to the user profile;

(c) displaying the locally stored data elements on a display device in response to user selection of the locally stored data elements;

(d) synthesizing a home page to display disjointed groups of locally stored data elements on the display device, the step of synthesizing including the step of weighting the relative value in selecting the home page;

(e) navigating among disjoint groups of the locally stored data elements with reference to the home page; and (f) modifying the user profile in correspondence to the data attributes of data elements selected by each user, and returning to step (b).

14. The method as recited in claim 13 wherein the step of navigating includes the steps of marking certain data elements as primary navigational pathways and displaying the locally stored data elements in correspondence to said certain data elements.

15. Circuitry for receiving data elements communicated from a common database to each of a plurality of users of the data elements, the data elements being communicated from a common database wherein: (i) interest categories for the database are defined which express the collective interest of the users; (ii) at least one of the interest categories is assigned to each data element; and (iii) data attributes for each of the data elements are identified, one of the data attributes being an interest level for at least one of the interest categories wherein each interest level expresses an estimate of the collective interest of the users in a corresponding one of said at least one interest categories, the circuitry comprising:

(a) generator means for generating a user profile indicative of data elements of interest for each user; means, coupled to said generator means, for selecting and for locally storing data elements of interest for each user in correspondence to the selections of each user with respect to the communicated data elements and with reference to the user profile; and (c) modification means, responsive to said means for selecting and for storing and coupled to said generator means, for modifying the user profile in correspondence to the data attributes of data elements selected by each user.

* * * * *